Dec. 17, 1935. G. H. WEBB 2,024,673
JOINT FOR ARTIFICIAL LIMBS
Filed Nov. 22, 1933
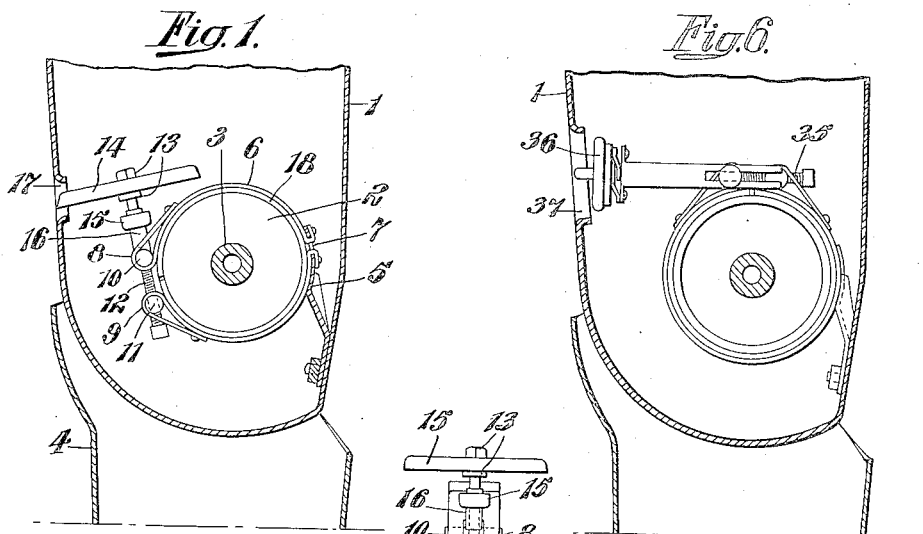
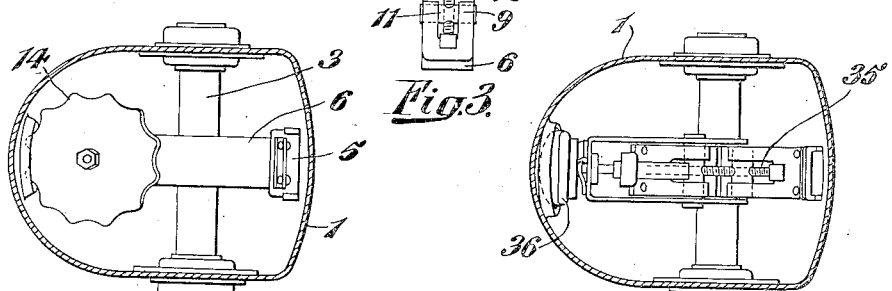
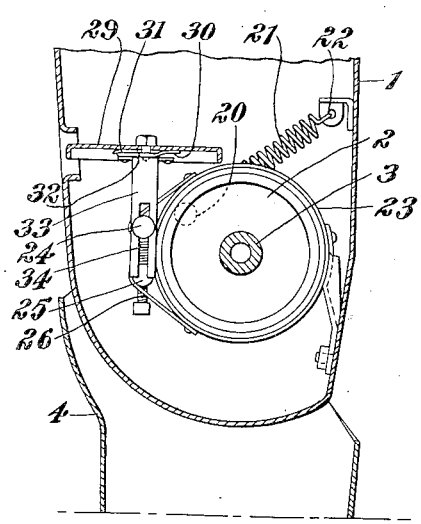
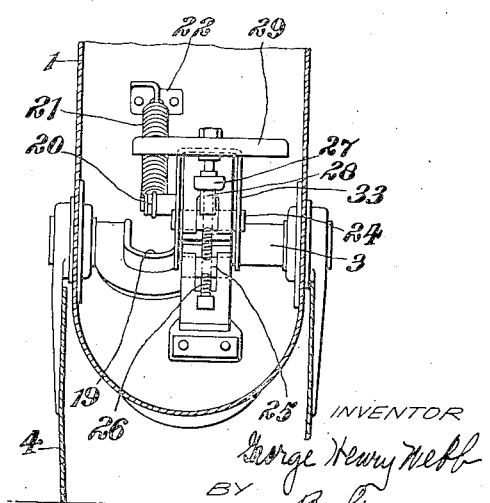
INVENTOR
George Henry Webb
BY B. Linger
ATTORNEY Patented Dec. 17, 1935

2,024,673

UNITED STATES PATENT OFFICE 2,024,673

JOINT FOR ARTIFICIAL LIMBS

George Henry Webb, Edgware, Middlesex, England, assignor to Desoutter Brothers Limited, London, England, a company of Great Britain Application November 22, 1933, Serial No. 699,267
In Great Britain December 2, 1932

12 Claims. (Cl. 3—2)

This invention relates to artificial legs and more particularly to the knee joints of such legs of the type having co-operating friction means for controlling the resistance to movement of the parts of the joint, and has for its object to provide improved means whereby regulation of the frictional control can be effected in a most simple and convenient manner to suit varying requirements and conditions.

Many forms of knee joints of the type above set forth have been proposed in which the adjustment of the frictional gripping between the co-operating parts has been effected by means of a separate tool, such for example as a key, screw driver or the like, from the exterior.

With knee joints constructed and arranged according to the present invention, the inconvenience of employing a separate tool is obviated, whilst the integral operating parts and the co-operating frictional surfaces are so related that the requisite regulation of the frictional gripping of the said co-operating surfaces can be effected by a simple finger or hand manipulation.

Thus, according to the invention, an artificial leg having a knee joint of the type provided with co-operating friction means for controlling the resistance to movement of the parts of the joint, is characterized by the fact that there is permanently associated therewith complete manipulating means having integral operating parts which are so related to the co-operating friction means that the requisite regulation of the frictional control can be effected from the exterior by a finger or hand operation of a light character.

In a preferred constructional form the knee joint has embodied therewith at least one drum member, preferably of large diameter and a co-operating brake band, together with means having a manipulating device permanently associated therewith and operable from the exterior of the limb, for varying the degree of frictional gripping between said brake band and drum member. The manipulating device may comprise a wheel, turn-button, lever or the like and is preferably located in such a position that the wearer of the leg can himself obtain ready access thereto at any time.

Many constructional embodiments of the invention are possible and in order that it may be fully understood various preferred embodiments will now be described with reference to the accompanying drawing wherein:—

Fig. 1 shows a transverse section of the knee joint of an artificial leg according to the invention.

Fig. 2 is a sectional plan view of Fig. 1, and

Fig. 3 is a detail elevational view of a portion of the device shown in Fig. 1.

Fig. 4 is a transverse sectional view of the knee joint of an artificial leg.

Fig. 5 is a sectional view of the same on a plane at right angles to that of Fig. 4.

Fig. 6 is a transverse sectional view of the knee joint of an artificial leg.

Fig. 7 is a sectional plan of the same.

In this particular method of carrying the invention into effect a single band brake and drum mechanism is provided and is located within the lower portion of the bucket member 1. The drum member 2 is formed from an aluminium alloy or other suitable material and is made integral with a hollow spindle 3 which is adapted to be connected with the shin part 4 of the leg (note Fig. 5).

The bucket portion 1 of the joint has attached thereto a fitting 5 which forms the anchorage for a brake band 6 of steel or other suitable material and formed in two parts, an upper and a lower part as is clearly shown in Fig. 1 of the drawing. The fitting 5 is comprised by a plate having a slot 7 through which the two turned round ends of the two parts of the brake band 6 are passed and riveted to the plate.

The two parts of the band 6 pass around the drum 2 and the ends thereof which are remote from the anchorage 5 are looped and slotted at 8 and 9 respectively, said loops carrying trunnions 10 and 11. The trunnion 11 is screw-threaded for the reception of a screw-threaded stem 12 which passes through a plain aperture formed in the trunnion 10. This screwed stem 12 has fixedly mounted thereon between clamping nuts 13 a flanged hand-wheel or what may be termed a finger-wheel 14. Between the finger-wheel 14 and the upper trunnion 10 there is provided a small thrust ball bearing 15 enclosed in a casing, a distance sleeve 16 being provided on the stem 12 between the said thrust bearing and the upper trunnion 10.

The periphery of the manipulating wheel 14 is notched or serrated and the parts are so disposed that it projects through a slotted aperture 17 formed in the front part of the bucket portion 1 just above the knee. In order that the manipulating wheel should not project beyond the confines of the bucket portion, the sheet metal material of the bucket in the neighbourhood of the slot 17 is formed as a recess permitting the serrations or notches of the manipulating wheel to be readily operated from the exterior. Moreover, to suit the angle of the parts, the notched periphery of the wheel 14 has a desired inclination to the axis of rotation.

The drum member 2 carries a desired thickness of leather or other suitable friction material 18 and the two parts of the brake band 6 are adapted to come around and into gripping contact with the friction material 18. It will be readily appreciated that by manipulating the wheel 14, for example even through the cloth or other material by which it is covered, the degree of frictional grip of the brake band with the drum member can be varied.

Moreover, owing to the construction, this variation may be accomplished at any time. Thus, if the frictional grip is set for any particular condition, for example normal walking, then by a mere adjustment of the wheel 14 effected through the material of the trousers of the user, the frictinonal grip may be varied to suit the conditions imposed by fast walking. All possible variations in the degree of frictional grip can thus be accomplished in an expeditious and convenient manner to suit the desire and purposes of the user.

It will be understood that many constructional variations of the arrangement shown may be adopted, for instance the fitting 5 may if desired be associated with the usual fitting for the anchorage of the so-called check card.

The invention is suitable for pivotal knee joints of artificial legs of any ordinary or usual construction and may be combined with such joints of other than usual construction; for example, it may be combined with such a joint as made in accordance with the specification of British Patent No. 382,563, in which case the arrangement may be such as is shown in Figs. 4 and 5 of the accompanying drawing wherein Fig. 4 shows a transverse sectional view of the knee joint of an artificial leg, whilst Fig. 5 is a sectional view taken at right angles to that of Fig. 4.

In this case the hollow sleeve or spindle 3 which is adapted to be connected to the shin portion 4 of the limb so that it rotates therewith, is cranked at 19 to one side whilst the drum 2 formed integral with the spindle 3 is provided with a pin 20 for anchoring one end of a spring 21, the other end of which is anchored at 22 to the bucket portion 1 of the limb. The function of the spring 21 upon pivotal movement of the joint is fully set forth in the specification of the British patent above mentioned.

The brake band 23 is in this instance formed from a single strip of steel or other suitable metal and is looped and slotted at its ends to carry trunnions 24 and 25, which latter together with a screwed stem 26, thrust ball bearing 27, distance sleeve 28 and manipulating wheel 29 are in general similar to that previously described with reference to Figs. 1, 2 and 3.

There is, however, provided in this case, means for maintaining the manipulating wheel 29 in the position to which it has been set, such means comprising a spring influenced detent device in cooperation with a series of apertures or depressions in an associated plate or member. The detent device is comprised by a washer 30 arranged beneath the lower surface of the manipulating wheel 29, said washer having a series of spring arms 31 at the ends of which detents or projections are provided. These detents or projections are adapted to co-operate with a series of depressions provided in a plate 33, which latter is formed as an integral part of a saddle member 33 which engages by means of a slot 34, with the outer ends of the trunnion 24. The manipulating wheel 29 is notched or serrated and preferably the series of depressions 32 so arranged that there is a depression for each of the notches or serrations provided on the manipulating wheel.

It will be readily understood that the operation of adjusting the frictional gripping between the brake band 23 and the drum member 2 is the same as that previously described with reference to Figs. 1, 2 and 3.

A further constructional embodiment of the invention is shown in Figs. 6 and 7, Fig. 6 being a transverse section of the knee joint of an artificial leg and Fig. 7 a sectional plan view of Fig. 6.

The band brake and drum mechanism in this case is similar to that described with reference to Figs. 4 and 5 but is distinguished from the said previous example by the fact that the rotary stem 35 of the friction adjusting means is horizontally arranged whilst in place of the manipulating wheel of the aforesaid example there is provided upon the outer end of the rotatable stem 35 a turn-button 36, the manual operation of which can be readily effected through an aperture 37 provided in the front wall of the bucket portion 1 of the limb.

Still further variations in the construction and arrangement and as the connection between the spindle 3 and the shin portion 4 may be adopted. Thus, although for ordinary normal artificial legs a single drum may be located midway between the sides of the bucket member such as has been more particularly described with reference to Figs. 1, 2, 6 and 7, in some cases a single drum may be located at or towards either side, or at both sides, or at one side and the centre, or at both sides and the centre.

Although in most cases it is most convenient and preferably to employ a flat band, in some cases the band may be concave or convex or a desired combination of flat, concave or convex. Again, where desired, the drum member may have one or a plurality of V grooves, or one or more portions of inverted V section, to receive a band or bands of corresponding co-operating section. Further, in certain cases the band may be replaced by a corresponding member of other section, such for example as a cable of circular section.

In some instances, more than one drum with associated bands may be utilized and in such cases the drums may be carried by one part and the bands by the other part, whilst in other cases one part may carry one or more drums and one or more bands and the other part may carry the corresponding co-operating members.

It will of course be understood that in cases where friction material is provided between the drum member proper and the brake band, such material may be secured to the band or the drum, or in some cases to both the band and the drum member, the attachment being effected by means of a suitable adhesive and enhanced by suitably serrating the surface of the band and/or the drum as the case may be.

In cases where the drum member is formed of a comparatively soft metal, for instance an aluminium alloy, it is preferable to provide the operative surface thereof with a rim of steel or other comparatively hard wearing metal.

The invention is not limited to the precise forms or details of construction described as these may be varied to suit particular cases.

What I claim and desire to secure by Letters Patent of the United States of America is:—

1. An artificial leg comprising two parts, a pivot connecting said parts, a drum connected to one of said parts, a band around the said drum and connected to the other of said parts, a screwed spindle, means connecting said screwed spindle to the ends of said band to draw the ends of said band towards one another and contract the band on the drum, operating means for said spindle arranged within one of the two parts of the leg, and means whereby said operating means can be actuated from the outside of the leg.

2. An artificial leg comprising two parts, a spindle connecting said parts, a drum fixedly mounted on said spindle, a band encircling the said drum, means connecting said band to one part of the leg, a screwed spindle, a nut on said screwed spindle cooperating with one end of said band whereby rotation of said spindle draws the ends of said band together to contract the band around the drum, a disc on said screwed spindle and means whereby said disc may be operated from the outside of the leg.

3. An artificial leg comprising upper and lower leg portions, a spindle secured to said lower leg portion and traversing the upper leg portion, bearing means on the upper leg portion cooperating with said spindle, a drum fixedly mounted on said spindle arranged within the upper leg portion, a band encircling said drum, means connecting an intermediate point of said band to said upper leg portion, a trunnion at each end of said band, a screwed spindle, a shoulder on said spindle against which one of said trunnions abuts, the other trunnion having a threaded aperture engaging with said screwed spindle, and a serrated disc on said spindle, the edge of which projects into an aperture arranged in the upper part of the leg to permit operation of said disc by a finger operation of light character.

4. An artificial leg comprising upper and lower leg portions, a spindle secured to said lower leg portion and traversing the upper leg portion, bearing means on the upper leg portion cooperating with said spindle, a drum fixedly mounted on said spindle arranged within the upper leg portion, a band encircling said drum, connecting means between an intermediate point of said band and the upper leg portion, trunnions at the extremities of said band, one of said trunnions being provided with a threaded aperture and the other having a larger, unthreaded aperture, a screwed spindle cooperating with the trunnion having a threaded aperture, a ball thrust bearing on said spindle bearing against the other trunnion, and a disc on said spindle, the edge of which is adapted to project into an aperture formed in the upper leg portion.

5. An artificial leg comprising upper and lower leg portions, a spindle secured to the lower leg portion and traversing the upper leg portion, bearings on said upper leg portion cooperating with the spindle, an enlarged drum on said spindle within the upper leg portion, a brake band formed in two pieces, an anchorage member connecting said two pieces of said brake band, said anchorage member being in turn secured to the upper leg portion, screw means for adjusting the contraction of said band around the drum, and an operating disc for said screw means, said disc being located within the upper leg portion but part of its edge projecting into an aperture therein to permit operation from the outside.

6. An artificial leg comprising upper and lower leg portions, a spindle secured to the lower leg portion and acting as a pivot for the upper leg portion, a drum secured to said spindle, a projection on said drum, a spring disposed between said projection and a bracket on the upper leg portion to control the relative movement of the upper and lower leg portions, a flexible brake band encircling said drum, screw means for regulating the contraction of said brake band around said drum and a disc for operating said screw means, said disc being located within the upper leg portion but part of the periphery thereof projecting into an aperture in said upper leg portion, to permit operation from the outside.

7. An artificial leg comprising upper and lower leg portions, a spindle secured to the lower leg portion and traversing said upper leg portion, bearings on said upper leg portion cooperating with said spindle, said spindle being recessed at the part thereof within the upper leg portion, a drum on said spindle also within the upper leg portion, a projection on said drum, a spring between said projection and a support on the upper leg portion, said spring being adapted to move into the recess in the spindle to become effective to hold the lower leg portion in either of two extreme positions relatively to the upper leg portion, a flexible brake band encircling said drum, screw means for varying the clamping action exerted by said brake band on the drum, and a disc for operating said screw means, said disc being located within the upper leg portion but projecting into an aperture in the side of said portion to permit operation from the outside.

8. An artificial leg comprising upper and lower leg portions, a spindle secured to the lower leg portion, means for pivoting the upper leg portion on said spindle, an enlarged drum on said spindle within the upper leg portion, a flexible brake band encircling said drum, means connecting said brake band to said upper leg portion, trunnions secured to the ends of said brake band, one of said trunnions having a threaded aperture and the other having a non-threaded aperture, a screwed spindle adapted to cooperate with the trunnion having a threaded aperture, the other trunnion being arranged around said spindle and abutting against a sleeve thereon, a ball thrust member against which said sleeve bears, a serrated disc on said spindle, part of the periphery of said disc being adapted to project into an aperture in the upper leg portion, and resilient detent means for holding said disc in the adjusted position.

9. An artificial leg comprising upper and lower leg portions, a spindle secured to said lower leg portion, means for pivotally supporting the upper leg portion on said spindle, an enlarged drum on said spindle, a brake band substantially encircling said brake drum and provided with end portions looped back on the band, trunnion members engaged in said looped back portions, one of said trunnion members having a threaded aperture and the other an enlarged, non-threaded aperture, a screwed spindle cooperating with that trunnion having a threaded aperture, the other trunnion being arranged on said spindle around the threaded portion thereof, a bearing member against which said latter trunnion bears, the said bearing member in turn cooperating with a ball thrust structure, and disc means on said spindle, part of the edge of said disc means projecting into an aperture in the leg to permit operation of the said disc and adjustment of the clamping action of the band on the drum from the outside of the leg.

10. An artificial leg comprising upper and lower leg portions, a pivot spindle secured to the lower leg portion and traversing the upper leg portion, means for pivotally supporting the upper leg portion on said pivot spindle, an enlarged drum on said pivot spindle within the upper leg portion, a brake drum of maximum possible size on said spindle, a brake band encircling said drum, anchoring means between said brake band and said upper leg portion, the ends of said brake band being looped over on themselves and cut away to form a forked part, trunnion members engaged in said looped over parts of the band, a spindle adapted to traverse the two trunnions, one of said trunnions being threaded to cooperate with a threaded part of the spindle, the other trunnion being non-threaded, a bearing member on said spindle on which said other trunnion bears, a ball thrust between said spindle and said bearing member, and a disc of which the plane is substantially normal to the surface of the upper leg portion, said disc projecting into an aperture formed in the said upper leg portion to permit operation from the outside thereof.

11. An artificial leg comprising upper and lower leg portions, a spindle secured to the lower leg portion and traversing the upper leg portion, bearing means for said upper leg portion on said spindle, a drum secured to said spindle formed of comparatively soft material, a facing layer of harder material on said drum, a band encircling said drum, means for connecting said band to the upper leg portion, screw means for adjustably contracting the ends of said band on the drum, and a serrated disc for adjusting said screw means, said disc being located behind an aperture in the upper leg portion to permit rotation of said disc from the outside.

12. An artificial leg comprising upper and lower leg portions, a spindle secured to the lower leg portion and traversing the upper leg portion, bearing means for said upper leg portion on said spindle, a drum secured to said spindle, a brake band encircling said drum, friction material secured to said drum or to said band, means for connecting said brake band to the upper leg portion, screw means for adjustably contracting the ends of said brake band on the drum, and a disc for operating said screw means, said disc being arranged so that a part of the periphery thereof projects into an aperture formed in the upper leg portion.

G. H. WEBB.